United States Patent [19]

Tsagas

[11] Patent Number: 5,531,109
[45] Date of Patent: Jul. 2, 1996

[54] INDICATOR OF THE AIR PRESSURE IN THE PNEUMATIC TIRES OF A VEHICLE BASED ON A CAPACITIVE COUPLING

[76] Inventor: Nicolaos Tsagas, Terma Nees Ergatikes Katikies, Xanthi 67100, Greece

[21] Appl. No.: 282,061

[22] Filed: Jul. 11, 1994

Related U.S. Application Data

[63] Continuation-in-part of Ser. No. 941,048, Oct. 7, 1992, abandoned.

[51] Int. Cl.$^6$ .............................. B60C 23/04; G01L 7/06
[52] U.S. Cl. ..................... 73/146.5; 73/146.8; 73/723; 73/729.1; 340/442; 340/445
[58] Field of Search ............................. 73/146.2, 146.3, 73/146.4, 146.5, 717, 723, 729.1; 340/442, 445, 448

[56] References Cited

U.S. PATENT DOCUMENTS

| 3,356,803 | 12/1967 | Redmond, Jr. | 73/723 X |
|---|---|---|---|
| 3,881,170 | 4/1975 | Hosaka et al. | 73/146.5 X |
| 4,072,926 | 2/1978 | Shimahara et al. | 73/146.5 X |
| 4,452,202 | 6/1984 | Meyer | 73/723 X |
| 4,476,725 | 10/1984 | Chorel et al. | 73/717 X |

FOREIGN PATENT DOCUMENTS

| 2122757 | 1/1984 | United Kingdom . |
|---|---|---|
| 9213730 | 8/1992 | WIPO . |

*Primary Examiner*—Richard Chilcot
*Assistant Examiner*—Joseph L. Felber

[57] ABSTRACT

A device for monitoring tire air pressure in each one of the wheels of a vehicle at any time, and providing the driver of the vehicle with a warning signal in case the pressure in any one of the vehicle's tires deviates from a normal predetermined value. The device includes a tire pressure gauge mounted onto the rotating tire, connected to a pair of air capacitors formed by four metallic annular strips, these capacitors being used as a timing capacitor in an oscillator producing two discrete frequencies depending on the ON-OFF position of the tire pressure gauge. Eventually a voltage comparator produces a square train pulse whenever its input falls below a certain level determined by a trimmer and the amplitude of the square train pulse is increased by a monostable multivibrator, the output of which drives an indicating LED to warn the vehicle's driver of the faulty air pressure in one of his tires.

13 Claims, 10 Drawing Sheets

Fig. 8a-f

INDICATOR OF THE AIR PRESSURE IN THE PNEUMATIC TIRES OF A VEHICLE BASED ON A CAPACITIVE COUPLING

This application is a continuation-in-part of application Ser. No. 07/941,048 filed Oct. 7, 1992, now abandoned.

BACKGROUND OF THE INVENTION

1. Field of the Invention

The present invention relates to an apparatus for indicating to the driver of a vehicle the air pressure in the pneumatic tires of the vehicle.

2. Description of the Prior Art

It is generally known that many road accidents are caused by tires being over-inflated or under-inflated. Over-inflated tires are the result of their overheating, being due either to excessive friction developing in the wheel assembly or to high vehicle speeds or to maintenance being made without due care. On the other hand, under-inflated tires are due to accidental puncturing, which is more likely with worn or low quality tires.

Unusual air pressure conditions in the tires, i.e. over or under-inflated tires, are dangerous and could be avoided by an automatic tire air pressure indicator which can operate as a road safety device. Furthermore, tires with proper air pressure could offer saving in tire cost, convenience, fuel economy and confidence for the drivers of motor vehicles and specially for those of long vehicles with twin tires.

Various devices have been developed in the prior art to detect and timely indicate to the driver of the vehicle, faulty air pressure in anyone of its tires. Basically the following principles of operation are used in those prior art devices:

a) The current collector method, wherein an air pressure gauge is mounted onto the rotating tire and an indicator at a nonrotating part of the vehicle, a current collector ring being used to connect the pressure gauge and indicator, where the current collector ring is fixed at the axle and a collector brush is fixed at the nonrotating part of the wheel assembly.

b) The wireless method, wherein the tire rim is provided with wireless frequency transmitter and transmitting antenna, whereas a receiving antenna and receiver are provided at the nonrotating part of the wheel assembly.

c) Various resonance circuit tire pressure detecting systems have also been developed in the prior art. A conventional resonance circuit system has been that wherein a detecting switch, an antenna and a circuit with inductance and capacitance is mounted onto the rotating tire and a transmitter and receiver at the nonrotating part of the vehicle wherein an intermittent retransmission of the abovementioned circuit occurs in response to the variations in tire air pressure, this retransmission being of the same frequency as the resonance frequency of the circuit.

Various disadvantages are associated with the aforementioned methods of the prior art, which have therefore not found broad application. The current collector ring method requires a sliding contact, wherein degradation of performance and lack of reliability tends to occur, sooner or later, caused by imperfect contact due to wear of the members, dust and mud. Further, the wireless method has a complicated structure necessitating mounting onto the rotating tire of a power source, e.g. battery, for the transmitter, which also makes the device unreliable and needs employment of severe maintenance standards.

Finally, the third conventional resonance circuit method also employs a complicated mechanism and tends to exhibit deviations in resonance, which also make the system unreliable. Tsagas EP-A-O 345 25199 disclosed an indicator of the air pressure in the tires of a vehicle, which utilized a pair of metallic annular strips, one strip being mounted on the rotating tire portion, and the other strip being mounted at a nonrotating part of the wheel assembly, a capacitive coupling occuring between these two strips, as a response to activating a tire pressure gauge detecting deviations from the predetermined normal tire pressure.

A disadvantage in the above Tsagas EP-A-O 345 199 system was that the tires had to be made with a special recession, within which fitted the abovementioned metallic annular strip, which was mounted at the rotating tire. Therefore application of this tire pressure detecting system was limited to tires of a particular design. Another disadvantage in the above Tsagas EP-A-O 345 199 system was that activation of the electronic circuit used to warn the driver of deviations from normal in the pressure of his tires, necessitated passage of electric current through the ball-bearing of the wheel shaft, wherein unpredictable cut-off of the warning signal occured due to the ball bearing lubricant.

Another disadvantage in the above, was that both the above mentioned metallic annular strips were exposed to rain water, mud, dust, etc, thereby resulting to undesired changes the capacitive coupling in between them.

SUMMARY OF THE INVENTION

A first object of the present invention is to provide an indicator of the air pressure in the pneumatic tires of a vehicle, which eliminates all the abovementioned disadvantages of the prior art and introduces an indicator with optimum reliability and accuracy, which does not require any frequent or special maintenance, has a long service life and competitive cost.

A second object of the present invention is to provide the indicator of the air pressure in the pneumatic tires of a vehicle, with a special design, dimensions and positioning within the wheel assembly so as to eliminate parasitic currents and obtain optimum efficiency in operation.

A third object of the present invention is to provide alternative designs for the indicator of the air pressure in the pneumatic tires of a vehicle, so that it may fit within the inner surface of the drum or disk brake of the wheel assembly, depending on whether a drum or disk brake system is used in the vehicle, such fitting of the proposed indicator offering protection to the same from rain water, mud, dust, etc.

Still, a further object of the invention is to propose, in association with the proposed indicator of the air pressure in the pneumatic tires of a vehicle, various alternative advantageous designs of the tire pressure gauge which is fitted onto the rotating tire.

The abovementioned objects of the present invention are realized in accordance to a first preferred embodiment of the invention with an indicator of the air pressure in the pneumatic tires of a vehicle, comprising: four metallic annular strips forming two air capacitors, the two air capacitors being electrically connected by means of a tire pressure gauge, the pressure gauge operating as an ON-OFF switch which can activate an electronic circuit and light a corresponding to the tire with faulty pressure visual means, such as a LED, wherein the electronic circuit comprises a high frequency oscillator and a frequency divider unit, an amplifier and a set of tuned filters unit, one LED for each one of the wheels of the vehicle, a half wave rectifier, voltage comparator and monostable multivibrator unit and a single polarity D.C. power supply to a symmetrical polarity D.C power supply converter.

Other embodiments of the invention are presented in the detailed description hereinafter.

BRIEF DESCRIPTION OF THE DRAWINGS

These and other objects and novel features of this invention will become apparent to those skilled in the art from the following detailed description by reference to the accompanying drawings.

DETAILED DESCRIPTION OF PREFERRED EMBODIMENTS

Figure 1:
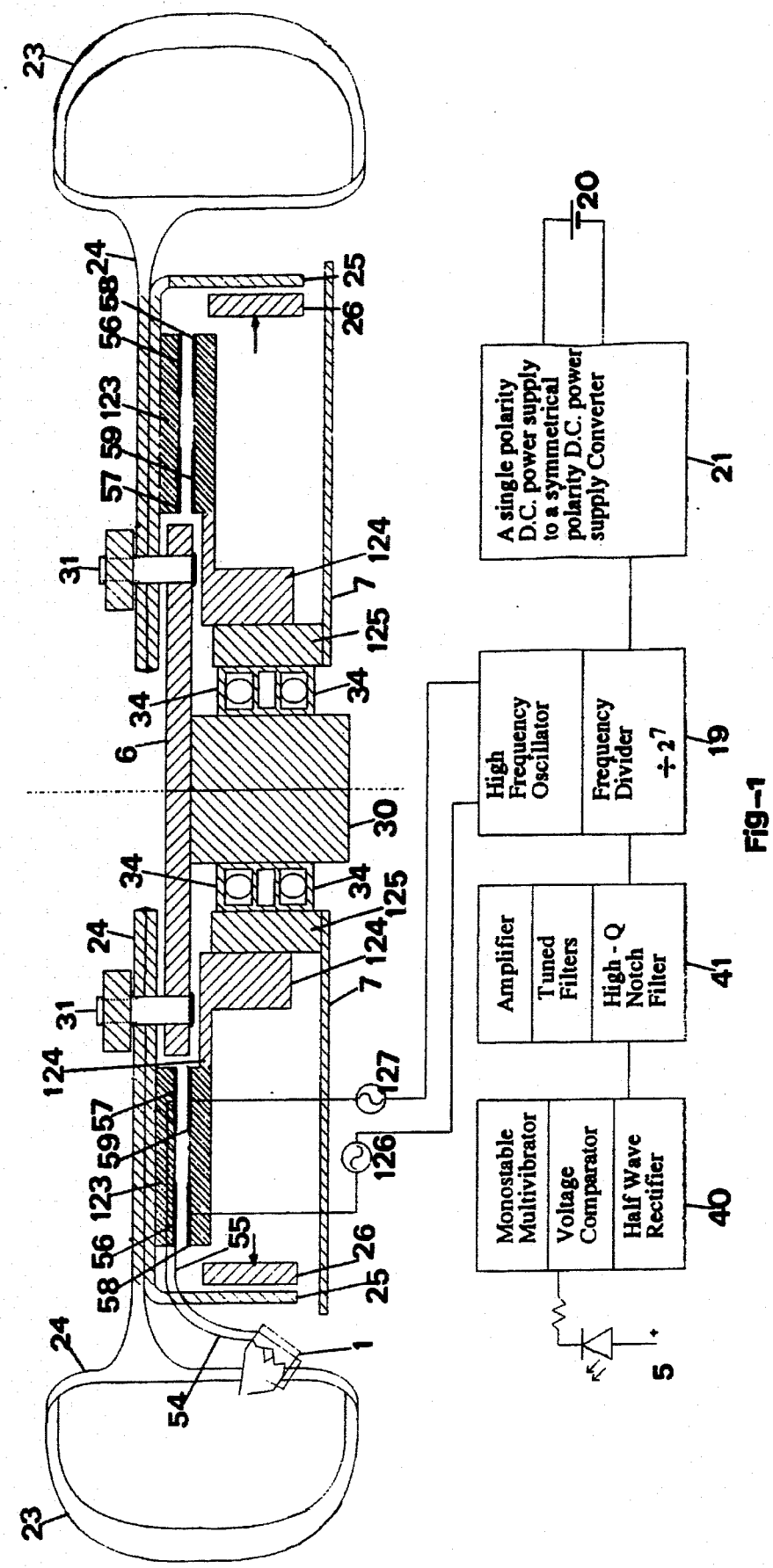
FIG. 1 shows a cross sectional view of a vehicle's wheel assembly within which is mounted the mechanical part of the proposed indicator in accordance to a first preferred embodiment, comprising two pairs of metallic strips. Also shown is a block diagram of the electronic circuit of the proposed indicator.

The detailed description of preferred embodiments and drawings hereinafter being made by reference to the accompanying drawings does not intend to limit the scope of the invention and it will be readily understood by one skilled in the art that the present invention is not anticipated by the prior art.

The proposed indicator of the air pressure in the pneumatic tires of a vehicle, in accordance to the present invention, employs for each one of the wheels of the vehicle, a pair of air capacitors connected to a pressure gauge mounted onto the wheel and an electronic circuit connected to the abovementioned pair of air capacitors, wherein when the air pressure in any one of the tires of the vehicle deviates from a normal predetermined value, the pressure gauge electrically connects two of the capacitor's plates, having the form of metallic strips and being mounted onto the rotating part of the wheel assembly, thereby effecting an enhanced capacitive coupling between the abovementioned two air capacitors, resulting to the activation of the abovementioned electronic circuit, by means of which a visual or sonar indication is given to the driver of the vehicle to warn him of the deviation from normal of the air pressure in one of his vehicle's tires.

Referring to any one of the accompanying FIGS. 1,2,5 or 6 a wheel assembly is shown to include a central rotating wheel shaft 30, its rotation taking place within a ball bearing 34 fixed within the cylindrical housing 125. Wheel shaft 30 is connected to a solid circular disk 6,upon which is mounted the brake drum 25 and the wheels' metallic rim 24, fixed thereupon by means of bolt and nut assemblies 31. The wheel assembly is shown to extend to the inflatable tire 23 and being internally protected by a metallic annular protection cap 7. Also shown in close contact with the periphery of the brake drum 25 is the brake pad 26. An insulating layer 123 is used for mounting the hereinbelow described rotating metallic strips of the invention onto the interior surface of brake drum 25. Also a supporting base 124 is fixed onto the nonrotating cylindrical housing 125, extending into an insulating basement onto which are mounted the hereinbelow described nonrotating metallic strips of the invention.

A pressure gauge/switch 1 is shown placed at the wheel's rim 24 so as to communicate with the interior of the pneumatic tire 23.

In accordance to a first preferred embodiment of the invention, depicted in FIG. 1, for each one of the wheels of the vehicle there are four metallic annular strips, a first metallic annular strip 56, a second metallic annular strip 57, a third metallic annular strip 58 and a fourth metallic annular strip 59, where the first pair of first and second metallic annular strips 56,57 is shown being supported by the insulating layer 123 and the second pair of third and fourth metallic annular strips 58, 59 is shown being supported by the insulating base 124. The first and second metallic annular strips 56,57 are rotating concentric, whilst the third and fourth metallic annular strips 58, 59 are concentric nonrotating. Two air capacitors 56–58 and 57–59 are thereby formed. The insulating layers 123 and 124 must be of low dielectric constant and their minimum thickness is approximately 2 mm. A pair of cables 55 and 54 from the pressure gauge 1 are connected to first and second metallic annular strips 56 and 57 respectively. The nonrotating third and fourth metallic annular strips 58 and 59 are connected to the electronic circuit of the invention, which is an integrated circuit, placed upon the stationary part of the wheel assembly.

Figure 3:
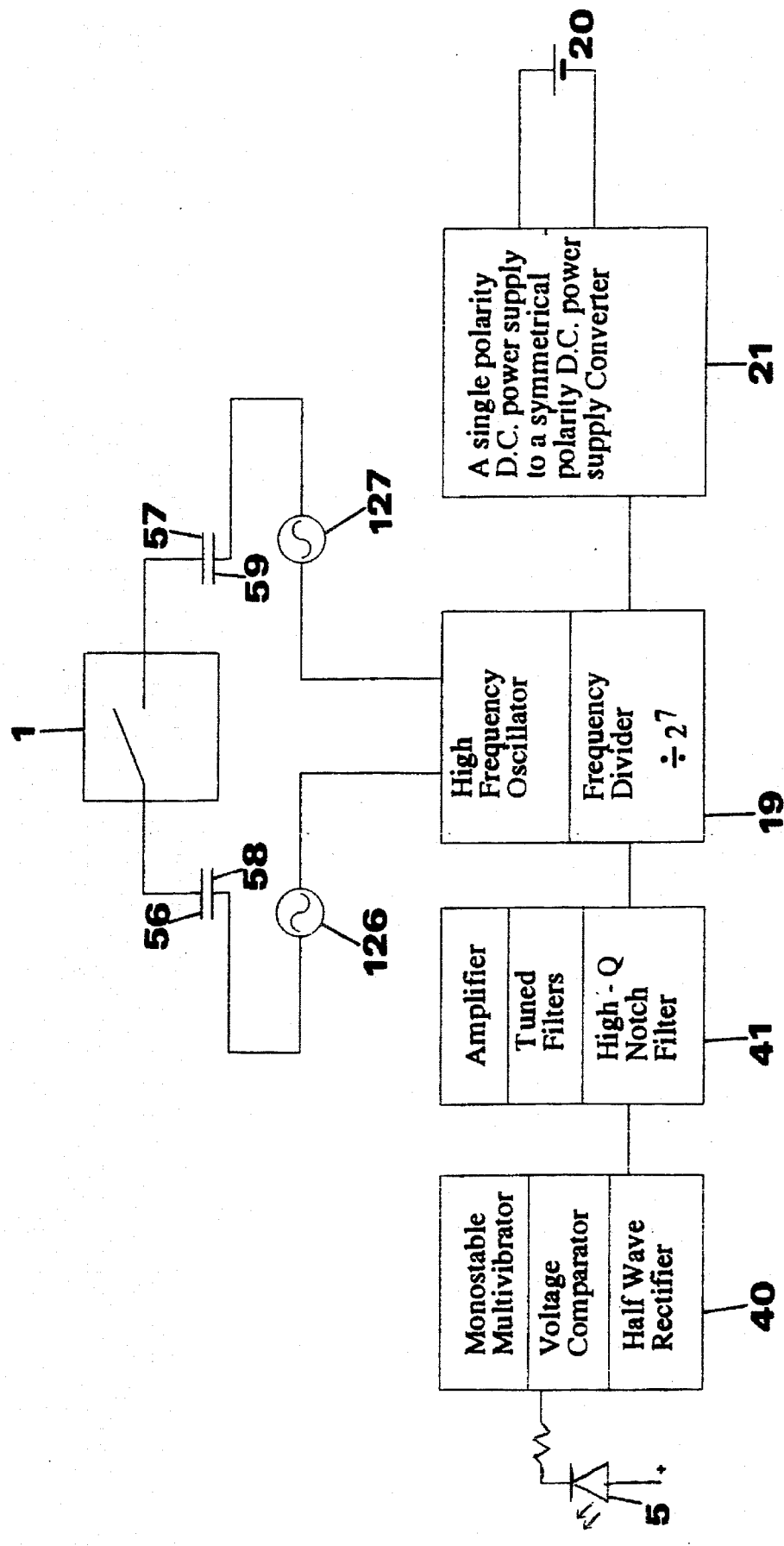
FIG. 3 shows a block diagram of the electronic circuit associated with the proposed indicator of FIGS. 1 and 2.
Figure 4:
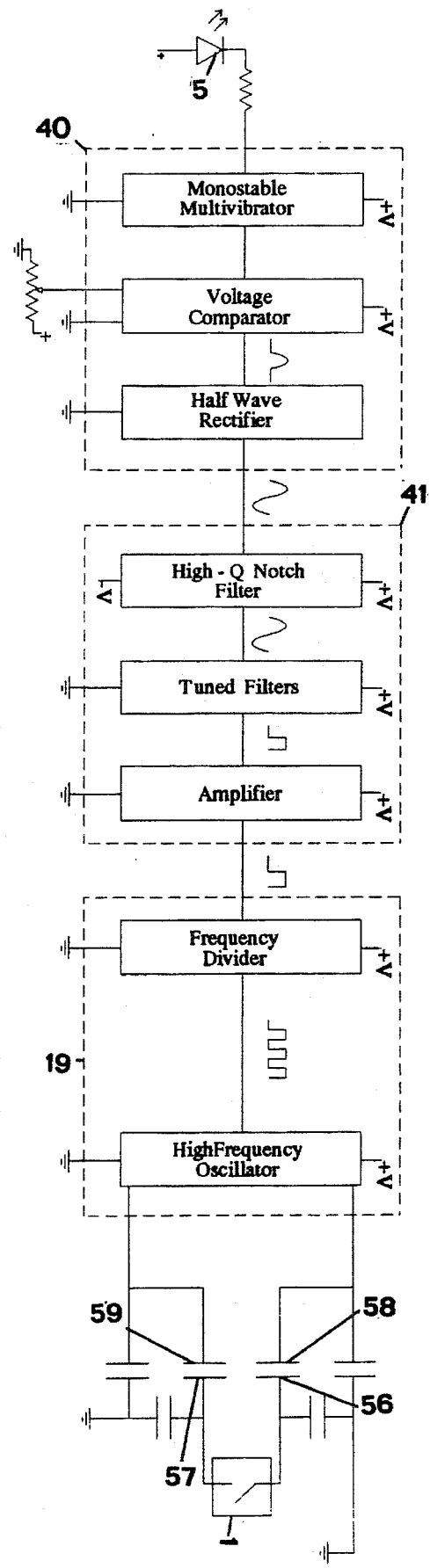
FIG. 4 is a more detailed block diagram of the electronic circuit of FIG. 3.

As shown in accompanying FIG. 3, the electronic circuit of the invention for each one of the wheels of the vehicle comprises a high frequency oscillator and frequency divider unit 19, an amplifier and filtering unit 41,and a half wave rectifier, voltage comparator and monostable multivibrator unit 40. The electronic circuit and specifically the high Frequency oscillator and frequency divider unit 19 is supplied with power from the electric D.C battery 20 of the vehicle, through a single polarity D.C. power supply to a symmetrical polarity D.C. power supply converter 21.

The electronic circuit is eventually connected via suitable cables to the third and fourth metallic annular strips 58 and 59. It is preferred to employ high frequency sinusoidal signals 126, 127 to reduce parasitic capacitive coupling due to the adjacent metallic parts of the wheel assembly. Eventually a LED 5 for each one of the wheels of the vehicle used to give to the vehicle's driver the warning of deviations from normal in the tire pressure, is shown connected to this electronic circuit.

The capacitance of capacitors 56-58 and 57-59 can obtain two different values, depending on whether the pressure gauge 1 is open or closed. The assembly of the first, second, third and fourth metallic annular strips 56,57,58,59 is used as a timing capacitor, in a high frequency oscillator to produce two frequency ranges.

The first frequency range is produced to correspond to the ON position of the tire pressure gauge 1 and the second frequency range is produced to correspond to OFF position of the same tire pressure gauge 1.

The high frequency oscillator and a frequency divider unit 19 is used as a means of producing a square train pulse which can pass through an arrangement 41 comprising an amplifier and a set of tuned filters, including a high-Q notch filter, which permits the fundamental frequency of the train pulse to pass in order to convert the square train pulse to a sinusoidal signal.

The filters are designed in such a way so that one of the two abovementioned frequency ranges falls in the gap of the notch filter while the second frequency range falls outside. The result in the output of the filter is that a necessary distinction between the two frequencies takes place since the first frequency which falls in the gap, passes with very high attenuation.

The next unit 40 is a half wave rectifier, a voltage comparator and a monostable multivibrator in which the rectifier converts the sinusoidal signal to the D.C level. The comparator provides an output of square train pulse whenever the input signal falls below a certain level determined by a trimmer and the monostable multivibrator increases the amplitude of the square train pulse of the voltage comparator output.

This monostable multivibrator is implemented by using a proper timing circuit and its output drives an indicating LED, corresponding to a tire with faulty air pressure.

Figure 2:
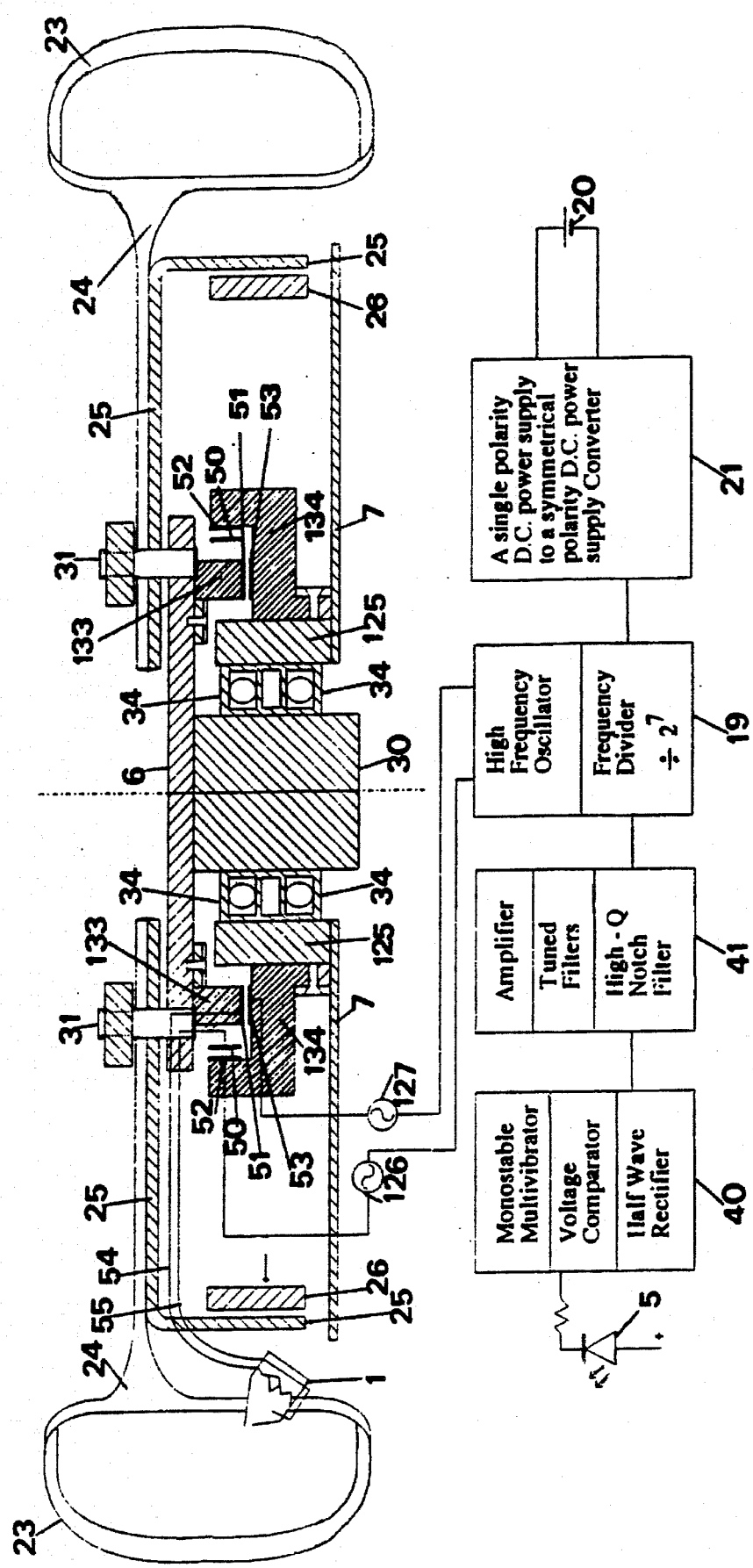
FIG. 2 shows a cross sectional view of a vehicle's wheel assembly within which is mounted the mechanical part of the proposed indicator in accordance to a second preferred embodiment, again comprising two pairs of metallic strips, but in different location and orientation from that of FIG. 1. The associated block diagram of the electronic circuit is the same as that of FIG. 1.

The operation efficiency of the indicator of the air pressure in the pneumatic tires of a vehicle in accordance to the above embodiment is improved when:

a thin layer of dielectric material of high dielectric constant is inserted within the air capacitors 56-58 and 57-59;

the facing surfaces of the metallic annular strips of the air capacitors 56-58 and 57-59 are coated with a paste of high dielectric constant mixed with an epoxy resin;

the separation coupling distance between the first and third metallic annular strips 56,58 of the air capacitor 56-58 and between the second and fourth metallic annular strips 57,59 of the air capacitor 57-59 is selected to be approximately 1 mm;

the area of each one of the first, second, third and fourth metallic annular strips 56, 57, 58, 59 is selected to be approximately the maximum allowed by the dimensions of the brake drum;

one independent integrated electronic circuit with a single LED 5 is used in each one of the wheels of the vehicle;

Furthermore, the operation efficiency of the proposed indicator is adversely effected by a parasitic capacitive coupling occuring between the first and second metallic annular strips 56,57, the third and fourth metallic annular strips 58,59, the second and third metallic annular strips 57,58, the first and fourth metallic annular strips 56, 59 and between the first, second, third and fourth metallic annular strips 56, 57, 58, 59 and adjacent metallic parts of the vehicle. In accordance to the invention this parasitic capacitive coupling is minimized when:

the first, second, third and fourth metallic annular strips 56,57,58,59 are fixed in a minimum distance of the order of 2 mm from the adjacent metallic parts of the wheel assembly;

a minimum spacing between the first and second metallic annular strips 56,57 and between the third and fourth metallic annular strips 58,59 is approximately 2 mm;

each one of the insulating layer 123 and the insulating base 124 have a low dielectric constant and a sufficient thickness so that the first, second, third and fourth metallic annular strips 56, 57, 58, 59 are in a maximum allowed distance from the adjacent metallic parts of the wheel assembly;

a minimum thickness of the insulating layer 123 and the insulating base 124 is approximately 2 mm;

In accordance to a second preferred embodiment of the invention, depicted in FIG. 2 the indicator of the air pressure in the pneumatic tire of the vehicle comprises, for each one of the wheels of the vehicle, four metallic strips, a first metallic strip 50, a second metallic strip 51, a third metallic strip 52 and a fourth metallic strip 53, wherein the first pair of the first and second metallic strips 50, 51 being mounted onto an insulating layer 133 and the second pair of the third and fourth metallic strips 52, 53 being mounted onto an insulated base 134. The first and second metallic strips 50 and 51 are rotating whilst the third and fourth metallic strips 52 and 53 are nonrotating. A first plane air capacitor 51-53 is formed between the second and fourth metallic strips 51 and 53, wherein each of the second and fourth metallic strips 51,53 is of plane annular construction and disposed in an orientation normal to the central rotating wheel shaft 30.

A second cylindrical air capacitor 50-52 is formed between the first and third metallic strips 50 and 52 wherein each of the metallic strips 50, 52 is of cylindrical construction and disposed in an orientation such that its central axis is parallel to the central rotating wheel shaft 30. The indicator further comprises an electronic circuit and a tire pressure gauge/switch. The electronic circuit includes a high frequency oscillator and a frequency divider unit 19, an amplifier and a set of tuned filters unit 41 and a unit 40 including a half wave rectifier, a voltage comparator and a monostable multivibrator. A square train pulse is produced by the unit 19, which can pass through the tuned filters, these tuned filters include a high-Q notch filter which permits the fundamental frequency of the train pulse to pass in order to convert the square train pulse to a sinusoidal signal. The half wave rectifier converts the sinusoidal signal to a D.C. level and the voltage comparator gives an output of a square train pulse whenever an input signal to the voltage comparator fails below a certain level. The monostable multivibrator increases the amplitude of the square train pulse of voltage comparator output. The tire pressure gauge 1 connects electrically as an ON-OFF switch the first and second metallic strips 50, 51 of the pair of air capacitors 50-52 and 51-53 wherein the pair of first and second air capacitors 51-53 and 50-52 is adapted so as to operate as a timing capacitor in the oscillator 19. Thus a first frequency range is produced to correspond to the ON position of the tire pressure gauge 1 and the second frequency range is produced to correspond to the OFF position of the tire pressure gauge 1.

The filters are designed in such a way so that the first frequency range falls within a gap of the notch filter and passes with very high attenuation, while the second frequency range falls outside the gap of the notch filter. The half wave rectifier converts the sinusoidal signal to the D.C. level. The voltage comparator provides the square train pulse output whenever the input signal to the voltage comparator falls below a certain level determined by a trimmer and the monostable multivibrator increases the amplitude of the square train pulse of the voltage comparator output by using a proper timing circuit and the output of the monostable multivibrator drives one of the LEDs 5 corresponding to a tire faulty air pressure. The insulating layer 133 is also mounted onto a disk brake of a wheel assembly of the vehicle.

The operation efficiency of the indicator of the air pressure in the pneumatic tires of a vehicle in accordance to the above embodiment 15 of the invention is improved when:

a thin layer of dielectric material of high dielectric constant is inserted within the first and second air capacitors 51–53 and 50, –52;

the facing surfaces of the first, second, third and fourth metallic strips 50, 51, 52, 53 of the first plane air capacitor 51–53 and second cylindrical air capacitor 50–52 are coated with a paste of high dielectric constant mixed with an epoxy resin;

the separation coupling distance between the second and fourth metallic strips 51, 53 of the first plane air capacitor 51–53 and between the first and third metallic strips 50, 52 of the second cylindrical air capacitor 50–52 is selected to be approximately 1 mm;

the area of each one of the first, second, third and fourth metallic strips 50,51,52,53 is selected to be the maximum allowed by the dimensions of the brake drum or brake disk, whichever is used in the particular vehicle;

one independent integrated electronic circuit with a single LED 5 is used in each one of the wheels of the vehicle.

Figure 5:
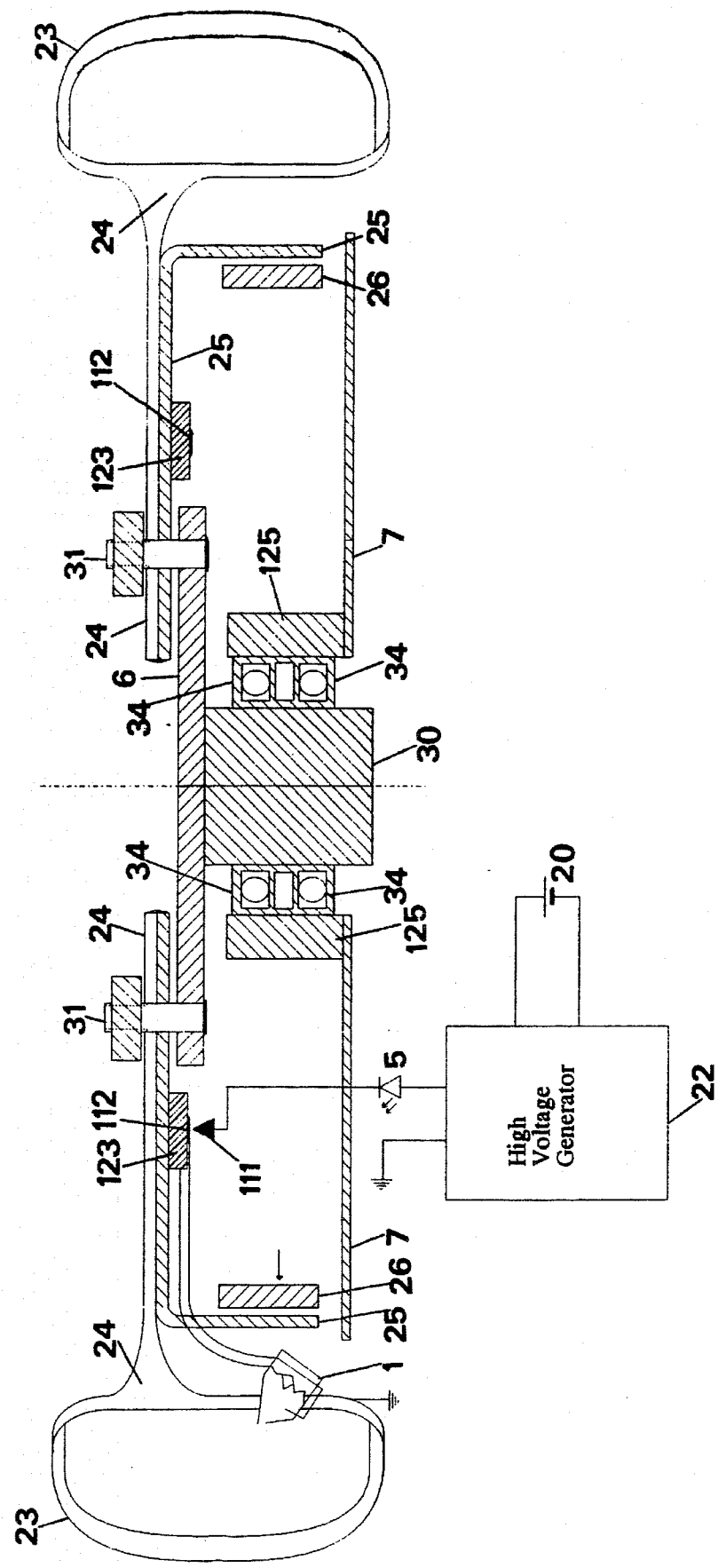
FIG. 5 shows a cross sectional view of a vehicle's wheel assembly, within which is mounted the mechanical part of the proposed indicator in accordance to a third preferred embodiment, comprising a rotating metallic annular strip and a stationary electrode pin. Also shown is a block diagram of the electronic circuit of this indicator.
Figure 6:
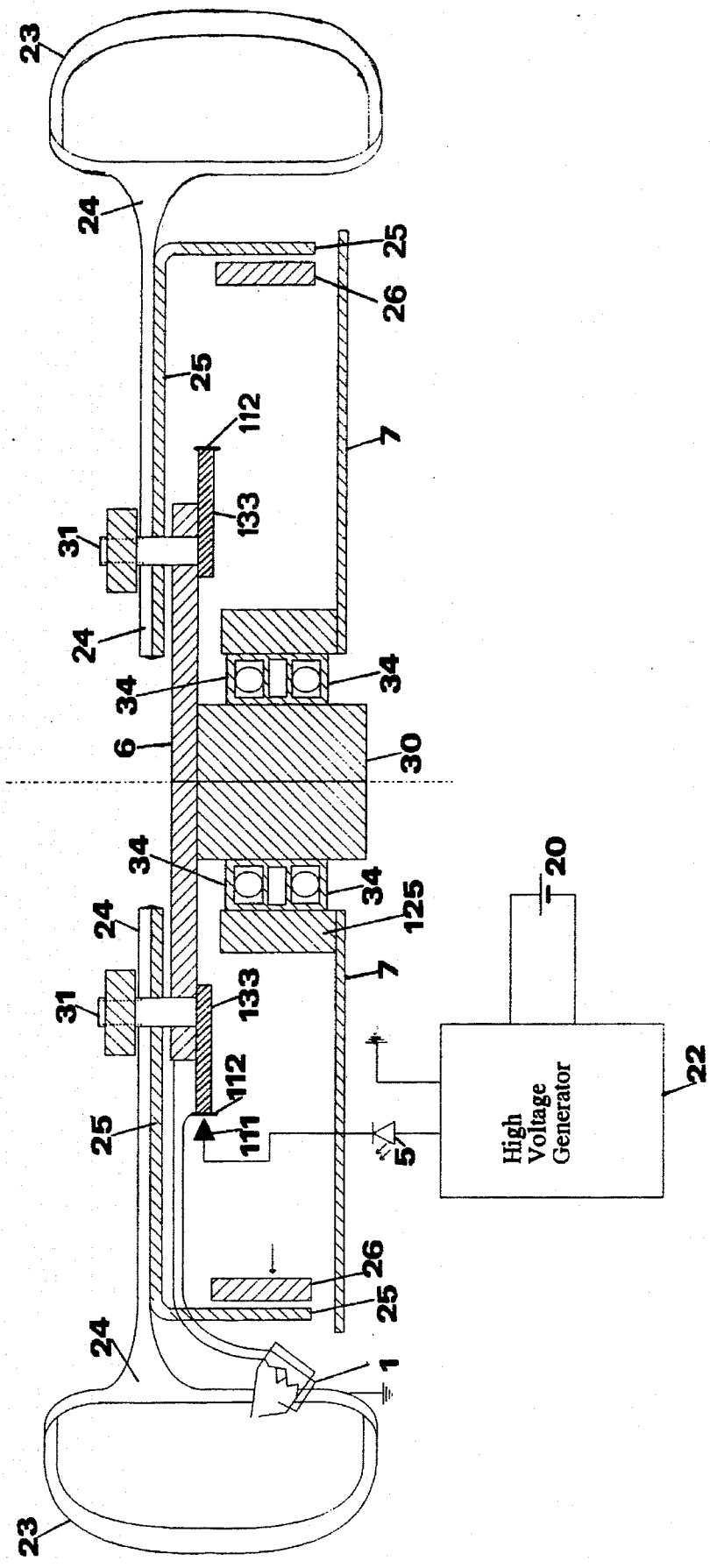
FIG. 6 shows a cross sectional view of a vehicle's wheel assembly within which is mounted the mechanical part of the proposed indicator in accordance to a fourth preferred embodiment, again comprising a rotating metallic strip and a stationary electrode pin, but in different location and orientation from that of FIG. 5. The associated block diagram of the electronic circuit is the same as that of FIG. 5.
Figure 7:
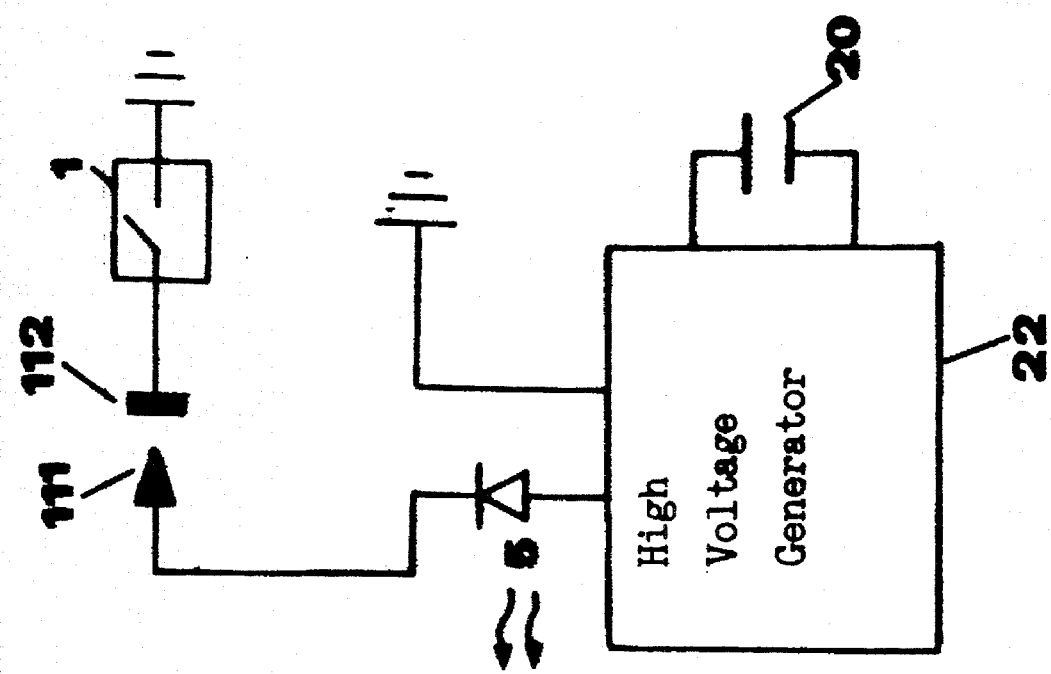
FIG. 7 shows a block diagram of the electronic circuit associated with the proposed indicator of FIGS. 5 and 6.
Figure 8A:
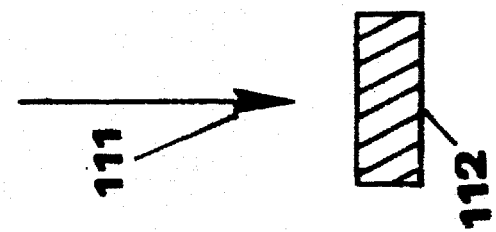
FIGS. 8a–8f show various forms of the pair of rotating metallic annular strip and stationary electrode pin, referred to in previous FIGS. 5 and 6.
Figure 8B:
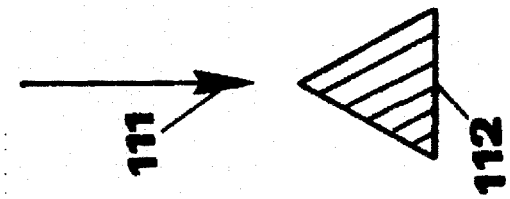
Figure 8C:
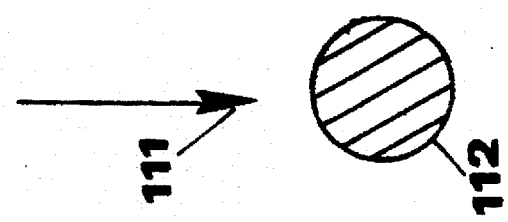
Figure 8D:
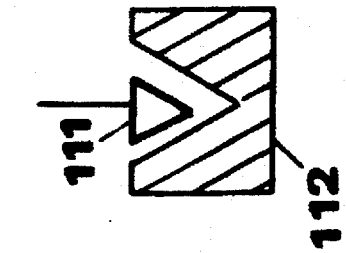
Figure 8E:
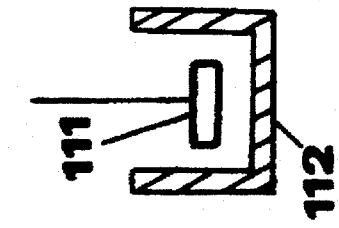
Figure 8F:
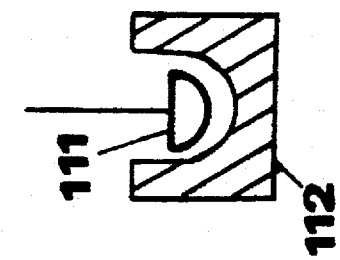

Furthermore, the operation efficiency of the proposed indicator is adversely effected by a parasitic capacitive coupling occuring between the first and second metallic strips 50, 51, the third and fourth metallic strips 52, 53, the second and third metallic strips 51, 52, the first and fourth metallic strips 50,53 and between the first, second, third and fourth metallic strips 50, 51, 52, 53 and adjacent metallic parts of the vehicle. In accordance to the invention this parasitic capacitive coupling is minimized when:

the first, second, third and fourth metallic strips 50,51, 52,53 are fixed in a minimum distance of the order of 2 mm from the adjacent metallic parts of the wheel assembly;

a minimum spacing between the first and second metallic strips 50,51 and between the third and fourth metallic strips 52, 53 is approximately 2 mm;

each one of the insulating layer 133 and the insulating base 134 have a low dielectric constant and a thickness selected to be the maximum allowed by the dimensions of the brake drum or brake disk, whichever is used in the particular vehicle;

a minimum thickness of the insulating layer 133 and the insulating base 134 is approximately 2 mm;

high frequency sinusoidal signals 126, 127 are applied to the nonrotating third and fourth metallic strips 52, 53 so that the surrounding metallic frame of the wheel assembly does not follow the fast changes of high frequency oscillation;

the cables connecting the integrated electronic circuit to each one of the LEDs are coated with thick insulating material of low dielectric constant;

In accordance to a third preferred embodiment of the invention, depicted in FIG. 5, the indicator of the air pressure in the pneumatic tire of the vehicle comprises a nonrotating infusible electrode pin 111, mounted onto a stationary part of the wheel assembly and rotating metallic annular electrode 112 mounted onto an insulated layer 123 on the inner surface of a drum brake of each of the vehicle's wheels. The indicator further comprises an electric circuit which includes a tire pressure gauge/switch 1 to electrically connect the metallic annular electrode 112 with the rotating metallic wheel rim and a high voltage generator 22 applying a high voltage between the nonrotating electrode pin 111 and the rotating metallic annular electrode 112 and a system of LEDs 5, one LED for each one of the wheels of the vehicle. The tire pressure gauge 1 operates as an ON-OFF switch and electric current flows in the electric circuit in response to an ON position of the tire pressure gauge 1 caused by a deviation of a tire air pressure from a normal predetermined value. An electric discharge occuring between the nonrotating electrode pin 111 and the rotating metallic annular electrode 112 results to a spark discharge coupling of the electrode pin 111 and the metallic annular electrode 112. The electric current eventually drives one the LEDs 5 corresponding to a tire with faulty air pressure.

The operation efficiency of the indicator of the air pressure in the pneumatic tires of a vehicle in accordance to the above embodiment of the invention is improved when:

the metallic annular electrode 112 is coated with a material having a secondary electron emission coefficient of high value;

the nonrotating electrode pin 111 is coated with a small quantity of a b-ray radioisotope;

the high voltage applied between the electrode pin 111 and the metallic annular electrode 112 is A.C. of high frequency;

thick insulating layers are used for mounting the electrode pin 111 and the metallic annular electrode 112 onto the wheel assembly, thereby minimizing parasitic currents occuring between the electrode pin 111 or the metallic annular electrode 112 and adjacent metallic surfaces of the wheel assembly;

In accordance to the invention, a plurality of novel designs is proposed for the tire pressure gauge used in either one of the above mentioned embodiments.

Figure 9C:
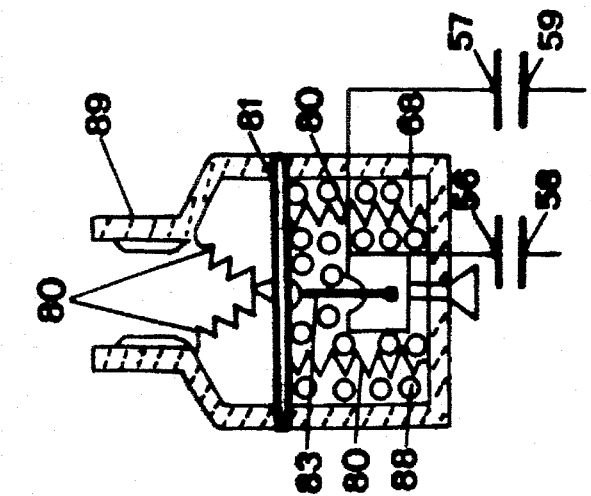
FIGS. 9a–9c show cross sectional views of various alternative forms of the pressure gauge used in the proposed indicator.
Figure 9B:
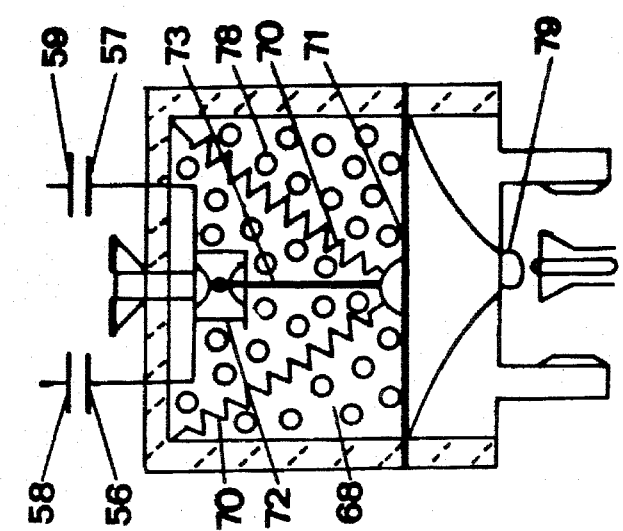
Figure 9A:
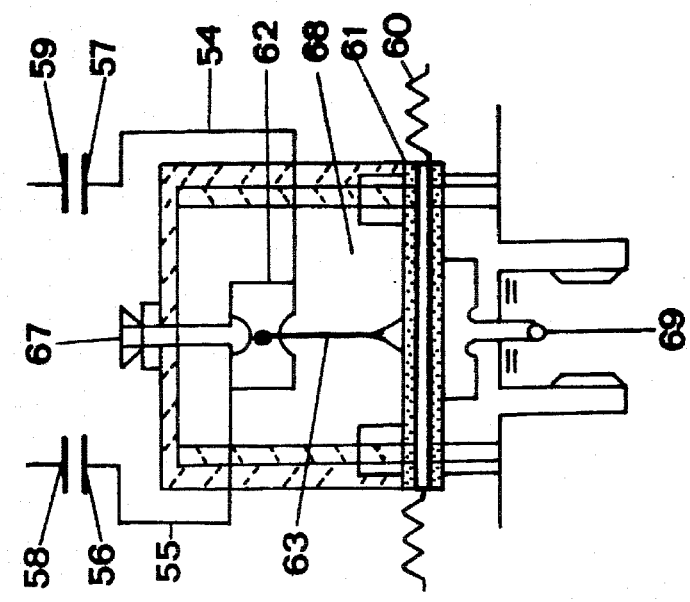

In accordance to a first preferred embodiment of the invention the tire pressure gauge 1 depicted in FIG. 9a comprises a pair of durable rubber layers 61 which have a certain thickness and contain in between them in a sandwich a thin curved zig-zag steel wire 60, these layers 61 enclosing air tightly in a chamber 68. The chamber 68 communicates through a tube 69 with the interior of the tire, wherein a sensitive ON-OFF microswitch 62 is electrically connected to the first and second metallic annular strips 56,57. An electrode 63 is mounted at the middle of the rubber layer 61 and this electrode 63 is connected with the steel wire 60. A regulating screw 67 extends the electrode 63, by means of which the position of the microswitch 62 can be adjusted as desired.

In accordance to a second preferred embodiment of the invention the tire pressure gauge 1 in FIG. 9b further comprises a plurality of small elastic rubber balls and foamy material 78 with elastic properties filling the chamber 68, soft springs 70 being diagonally disposed within the chamber 68 so as to enhance elasticity of the foamy material and the small elastic rubber balls 78.

In accordance to a third preferred embodiment of the invention the tire pressure gauge 1 in FIG. 9c is further comprises a compressed gas filling a portion 88 of said chamber 68, where portion 88 of the chamber 68 is closed on the top by a rubber layer 81. The rubber layer 81 is held in position by a pair of extending springs 80 being fixed to the walls of the tire pressure gauge 1.

Figure 10B:
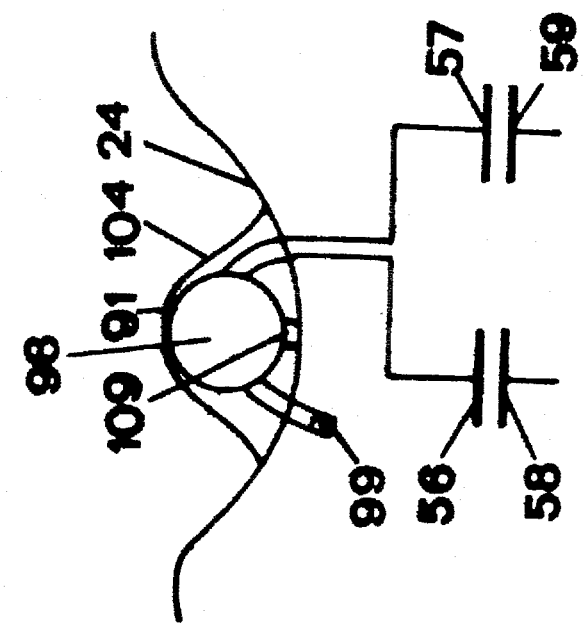
FIGS. 10a and 10b illustrate a further alternative view of a pressure gauge that can be used in association with the proposed indicator of the invention.
Figure 10A:
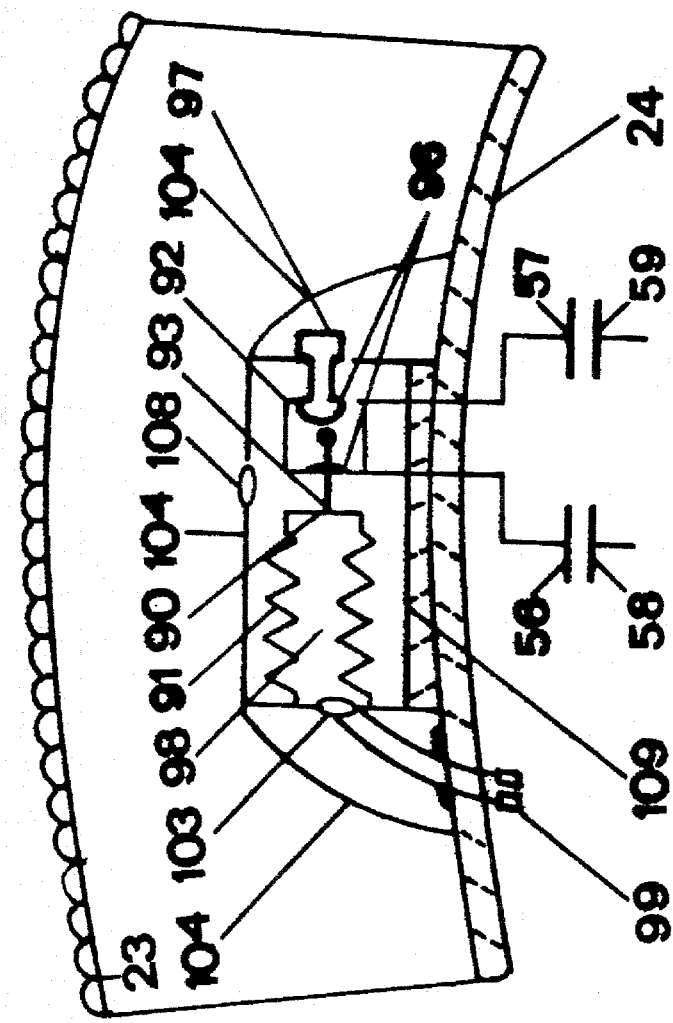

In accordance to a fourth preferred embodiment of the invention the tire pressure gauge 1 of FIGS. 10a and 10b being disposed onto an air inlet valve 99. The inlet valve 99 is fixed internally onto the metallic rim 24 of the wheel assembly. The pressure gauge 1 comprises a small chamber 98 with folding wails 91 made by rubber thin metallic layers, wherein one end of the electrode 93 is mounted on wall 90 and the other end of the electrode 93 moves between a pair of contact points 96 of a microswitch 92. The wall 103 is fixedly mounted on the internal walls, of a metallic box 104, while the wall 90 moves freely along an axis parallel to the cylindrical wall 91 and the base 109 of metallic box 104. The base 109 is fixedly mounted on the internal side of the wheel's rim 24 and the interior of the tire 23 communicates with the interior of the box 104,109 through the opening 108 of the wall 104. The chamber 98 is filled up by a heavy gas with a pressure equivalent to the normal tire pressure and alternatively by air through the inlet valve 99. The inlet valve 99 is, fixed on the wall 103 and projects outwards the rim 24. The tire pressure gauge 1 of FIGS. 10a and 10b is disposed onto the air inlet valve 99, but can be also fixed onto the external side of the wheel's assembly. The air inlet valve 99 is used for calibration purposes, instead of screw 97, to adjust the correct position of electrode edge 93 in between the contact points 96. Provided the air pressure in the tire is normal, then pressurized air is admitted in the chamber 98 up to the electrode edge 93, which subsequently moves away from the contact points 96 and reaches the middle point of the distance between the contact points 96. The average value of the two air pressures in the chamber 98 when the LED 5 turns ON-OFF-ON gives an indication of the correct position of the electrode edge 93.

All types of the abovementioned illustrative embodiments of pressure gauge sensors are disposed on air inlet valves which are fixed externally on the metallic rim of the wheel's assembly and they can be also disposed on the internal side of the metallic rim 24.

The additional weight of the pressure gauge, disposed on the rim, causes centrifugal forces which can be avoided by locating the pressure gauge in a small box close to the center of the rim 24. The pressure gauge communicates with the interior of the tire chamber through a thin flexible tube with durable walls.

Materials with ohmic resistance varying accordance to the applied air pressure could be used as the base for making pressure gauge sensors.

Finally a common electronic circuit, with a plurality of LEDs 5 corresponding to the number of the wheels of the vehicle, can be used for all the wheels of the vehicle.

I claim:

1. An indicator of the air pressure in the pneumatic tires of a vehicle, comprising for each one of the wheels of the vehicle a first metallic annular strip, a second metallic annular strip, a third metallic annular strip and a fourth metallic annular scrip, first pair comprised of said first and second metallic annular strips being concentrically mounted onto an insulating layer fixed onto the inner surface of a brake drum and a second pair comprised of said third and fourth metallic annular strips being concentrically mounted onto a nonrotating insulated base fixed on a nonrotating part of said vehicle, a pair of air capacitors being formed between said first pair, and said second pair of metallic annular strips said indicator further comprising an integrated electronic circuit which includes a high frequency oscillator and a frequency divider unit to produce a square train pulse, an amplifier and a set of tuned filters unit including a high-Q notch filter permitting the fundamental frequency of said square train pulse pass in order to convert said square train pulse to a sinusoidal signal, a system of LEDs, one LED for each one of the wheels of the vehicle, a unit including a half wave rectifier converting said sinusoidal signal to a D.C. level, a voltage comparator giving an output of a square train pulse whenever an input signal to said voltage comparator falls below a certain level and a monostable multivibrator increasing the amplitude of the square train pulse of said voltage comparator output, a single polarity D.C. power supply to a symmetrical polarity D.C. power supply converter and a tire pressure gauge to connect electrically as an ON- OFF switch said first pair of first and second metallic annular strips said pair of air capacitors being adapted to operate as a timing capacitor in said oscillator, wherein a first frequency range is produced to correspond to the ON position of said tire pressure gauge and a second frequency range is produced to correspond to the OFF position of said tire pressure gauge, wherein said first frequency range falls within a gap of notch filter of said amplifier and set of tuned filters unit and passes with an attenuation of the order of one hundred, while said second frequency range falls outside the gap of said notch filter and wherein said half wave rectifier converts the sinusoidal signal to the D.C. level, said voltage comparator providing said square train pulse output whenever the input signal to said voltage comparator falls below a certain level determined by a trimmer and said monostable multivibrator increasing the amplitude of the square train pulse of said voltage comparator output by using a timing circuit, an output of said monostable multivibrator driving one of said LEDs, corresponding to a tire with abnormal air pressure.

2. The indicator of the air pressure in the pneumatic tires of a vehicle, as claimed in claim 1, wherein the operation efficiency of said indicator is improved when:

a thin layer of dielectric material of high dielectric constant is inserted within said air capacitors;

the surfaces of said first, second, third and fourth metallic annular strips of said air capacitors that face each other are coated with a paste of high dielectric constant mixed with an epoxy resin;

the separation coupling distance between said first and third metallic annular strips and said second and fourth metallic annular strips is selected to be approximately 1 mm;

the area of each one of said first, second, third and fourth metallic annular strips is selected to be the maximum allowed by the dimensions of said brake drum;

a parasitic capacitive coupling occurring between said first and second metallic annular strips, said third and fourth metallic annular strips, said second and third metallic annular strips, said first and fourth metallic annular strips and between said first, second, third and fourth metallic annular strips and adjacent metallic parts of the vehicle is minimized, minimization of said parasitic capacitive coupling being effected when:

said first, second, third and fourth metallic annular strips are fixed at a distance which is selected to be the maximum from adjacent metallic surfaces of said wheel assembly, allowed by the dimensions of said brake drum;

said first, second, third and fourth metallic annular strips are fixed at a minimum distance of the order of 2 mm from adjacent metallic parts of said wheel assembly;

a minimum spacing between said first and second concentric metallic annular strips and between said third and fourth concentric metallic annular strips is approximately 2 mm;

each one of said insulating layer and said insulated base have a low dielectric constant and a thickness which is selected to be the maximum allowed by the dimensions of said wheel assembly;

a minimum thickness of each of said insulating layer and said insulating base is approximately 2 mm;

high frequency sinusoidal signals are applied at said third and fourth metallic annular strips so that the surrounding metallic frame of said wheel assembly does not follow the fast changes of high frequency oscillation;

the cables connecting said integrated electronic circuit to each one of said LEDs are coated with thick insulating material of low dielectric constant.

3. An indicator of the air pressure in the pneumatic tires of a vehicle, as claimed in above claim 1, wherein said integrated electronic circuit comprises a plurality of LEDs corresponding to the number of the wheels of the vehicle, so that a single integrated electronic circuit is used for all the wheels of the vehicle.

4. An indicator of the air pressure in the pneumatic tires of a vehicle, as claimed in claim 1, said tire pressure gauge comprising a pair of durable rubber layers of a certain thickness, said pair of durable rubber layers containing therebetween a thin curved zig-zag steel wire, said durable rubber layers closing air-tightly a chamber, said chamber communicating through a tube with the interior of said tire, wherein a sensitive ON-OFF microswitch is electrically connected to said first and second metallic annular strips, an electrode being mounted at the middle of said pair of rubber layers, said electrode being connected with said steel wire, wherein a regulating screw is used to adjust the position of said microswitch.

5. An indicator of the air pressure in the pneumatic tires of a vehicle as claimed in above claim 4, said tire pressure gauge further comprising a plurality of small elastic rubber balls and foamy material with elastic properties filling said chamber, soft springs being diagonally disposed within said chamber so as to enhance elasticity of said foamy material and said small elastic rubber balls.

6. An indicator of the air pressure in the pneumatic tires of a vehicle as claimed in above claim 4, said tire pressure gauge further comprising compressed gas filling a portion of said chamber, said portion of said chamber being closed on the top by a rubber layer, said rubber layer being held in position by a pair of springs being fixed to the walls of said tire pressure gauge.

7. An indicator of the air pressure in the pneumatic tires of a vehicle as claimed in claim 4, said tire pressure gauge being disposed onto an air inlet valve opening, said air inlet valve opening being fixed externally onto a metallic rim of said wheel assembly.

8. An indicator of the air pressure in the pneumatic tires of a vehicle as claimed in claim 4, said tire pressure gauge being disposed onto an air inlet valve opening, said air inlet valve opening being fixed internally onto a metallic rim of said wheel assembly.

9. An indicator of the air pressure in the pneumatic tires of a vehicle as claimed in claim 1, said tire pressure gauge comprising a small chamber with folding walls made by rubber and thin metallic layers, wherein one end of an electrode is fastened on the base of said small chamber and the other end of said electrode moves between a pair of contact points of a microswitch, wherein a first wall is fixed mounted on the internal walls of a metallic box, a second wall moves freely along an axis parallel to said folding walls and a base of said metallic box, said base being fixedly mounted on the internal side of said wheel's rim and wherein the interior of said tire communicates with the interior of said box through an opening of the side wall of said metallic box, wherein said chamber is filled up with a heavy gas with a pressure equivalent to a normal tire pressure.

10. An indicator of the air pressure in the pneumatic tires of a vehicle as claimed in claim 9, wherein said small chamber is filled up with air through an inlet valve, said inlet valve being fixed on said first wall and projecting outward from a metallic rim of said wheel assembly.

11. An indicator of the air pressure in the pneumatic tires of a vehicle, comprising for each one of the wheels of the vehicle a first metallic strip, a second metallic strip, a third metallic strip and a fourth metallic strip, a first pair comprised of said first and second metallic strips being mounted onto an insulating layer fixed onto the inner surface of a brake drum and a second pair comprised of said third and forth metallic strips being mounted onto a nonrotating insulated base fixed on a nonrotating part of said vehicle, a pair of air capacitors being formed comprising a plane air capacitors and a cylindrical air capacitor, said plane air capacitor being formed between said second and fourth metallic strips wherein said second and fourth metallic strips are of plane annular construction and disposed in an orientation normal to the central rotating wheel shaft, and said cylindrical air capacitor being formed between said first and third metallic strips, wherein each of said first and third metallic strips is of cylindrical construction and disposed in an orientation parallel to the central rotating wheel shaft, said indicator further comprising an integrated electronic circuit which includes a high frequency oscillator and a frequency divider unit to produce a square train pulse, an amplifier and a set of tuned filters unit including a high-Q notch filter permitting the fundamental frequency of said square train pulse to pass in order to convert said square train pulse to a sinusoidal signal, a system of LEDs, one LED for each one of the wheels of the vehicle, a unit including a half wave rectifier converting said sinusoidal signal to a D.C. level, a voltage comparator giving an output of said square train pulse whenever an input signal to said voltage comparator falls below a certain level and a monostable multivibrator increasing the amplitude of the square train pulse of said voltage comparator output, a single polarity D.C. power supply to a symmetrical polarity D.C. power supply converter and a tire pressure gauge to connect electrically as an ON-OFF switch said first pair of metallic annular strips of said pair of air capacitors, said pair of air capacitors being adapted to operate as a timing capacitor in said oscillator, wherein a first frequency range is produced to correspond to the ON position of said tire pressure gauge and a second frequency range is produced to correspond to the OFF position of said tire pressure gauge, wherein said first frequency range falls within a gap of said notch filter of said amplifier and set of tuned filters unit and passes with an attenuation, of the order of one hundred while said second frequency range falls outside the gap of said notch filter and wherein said half wave rectifier converts the sinusoidal signal to the D.C. level, said voltage comparator providing said square train pulse output whenever the input signal to said voltage comparator falls below a certain level determined by a trimmer and said monostable multivibrator increasing the amplitude of the square train pulse of said voltage comparator output by using a timing circuit, an output of said monostable multivibrator driving one of said LEDs corresponding to a tire with abnormal air pressure.

12. The indicator of the air pressure in the pneumatic tires of a vehicle as claimed in above claim 3, wherein the operation efficiency of said indicator is improved when:

a thin layer of dielectric material of high dielectric constant is inserted within said plane air capacitor and said cylindrical air capacitor;

the surfaces of said first, second third and fourth metallic strips of said plane air capacitor and said cylindrical air capacitor that face each other are coated with a paste of high dielectric constant mixed with an epoxy resin;

the separation coupling distance between said second and fourth metallic strips of said plane air capacitor and between the first and third metallic strips of said cylindrical air capacitor is selected to be approximately 1 mm;

the area of each one of said first, second, third and fourth metallic strips is selected to be the maximum allowed by the dimensions of said brake drum;

a parasitic capacitive coupling occuring between said first and second metallic strips, said third and fourth metallic strips, said second and third metallic strips said first and fourth metallic strips and between said first, second, third and fourth metallic strips and adjacent metallic parts of the vehicle is minimized, minimization of said parasitic capacitive coupling being effected when: said first, second, third and fourth metallic strips are fixed at a distance which is selected to be the maximum from adjacent metallic parts of said wheel assembly allowed by the dimensions of said wheel assembly;

said first, second, third and fourth metallic annular strips are fixed at a minimum distance of the order of 2 mm from adjacent metallic parts of said wheel assembly;

a minimum spacing between said first and second metallic strips and between said third and fourth metallic strips is approximately 2 mm;

each one of said insulating layer and said insulating base has a low dielectric constant and a thickness which is selected to be the maximum allowed by the dimensions of said wheel assembly;

a minimum thickness of said insulating layer and said insulating base is approximately 2 mm;

high frequency sinusoidal signals are applied at said third and fourth metallic strips, so that the surrounding metallic frame of said wheel assembly does not follow the fast changes of high frequency oscillation;

the cables connecting said integrated electronic circuit to each one of said LEDs are coated with thick insulating material of a low dielectric constant.

13. An indicator of the air pressure in the pneumatic tires of a vehicle, as claimed in claim 11 said tire pressure gauge comprising a pair of durable rubber layers of a certain thickness containing therebetween a thin curved zig-zag steel wire and said closing air-tightly a chamber, said chamber communicating through a tube with the interior of said tire, wherein a sensitive ON-OFF microswitch is electrically connected to said first and second metallic annular strips, an electrode being fastened at the middle of said rubber layers, said electrode being connected with said steel wire, wherein a regulating screw is used to adjust the position of said microswitch.

\* \* \* \* \*